(12) United States Patent
Webb et al.

(10) Patent No.: US 8,764,092 B2
(45) Date of Patent: Jul. 1, 2014

(54) PROTECTIVE DEVICE FOR VEHICLE WIPER ASSEMBLY

(75) Inventors: Scott R. Webb, Macomb Township, MI (US); Nicholas W. Pinto, IV, Ferndale, MI (US); Paul W. Alexander, Ypsilanti, MI (US); Wendell G. Summerville, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 13/238,021

(22) Filed: Sep. 21, 2011

(65) Prior Publication Data

US 2013/0069387 A1    Mar. 21, 2013

(51) Int. Cl.
| | |
|---|---|
| *B62D 37/02* | (2006.01) |
| *B60S 1/04* | (2006.01) |
| *B60S 1/58* | (2006.01) |
| *B60S 1/34* | (2006.01) |
| *B60S 3/00* | (2006.01) |

(52) U.S. Cl.
CPC .............. *B60S 1/0402* (2013.01); *B60S 1/3445* (2013.01); *B60S 3/00* (2013.01); *B60S 1/583* (2013.01); *B60S 1/0491* (2013.01)
USPC .................. 296/96.17; 296/96.15; 15/250.16

(58) Field of Classification Search
USPC ............ 296/96.15, 96.16, 96.17; 15/250.001, 15/250.201, 250.31
See application file for complete search history.

(56) References Cited

U.S. PATENT DOCUMENTS

| | | | | |
|---|---|---|---|---|
| 3,226,756 | A * | 1/1966 | Heiler ........................ | 15/250.19 |
| 4,756,568 | A * | 7/1988 | Yamamoto et al. ........ | 296/180.1 |
| 2013/0042426 | A1 * | 2/2013 | Webb et al. ................ | 15/250.17 |

* cited by examiner

*Primary Examiner* — Joseph Pape
(74) *Attorney, Agent, or Firm* — Quinn Law Group, PLLC

(57) ABSTRACT

A protective device for a vehicle wiper assembly is provided. The protective device is configured to selectively at least partially cover the wiper assembly and prevent the wiper assembly from being pulled away from the vehicle. For example, the protective device may prevent entanglement of the wiper assembly with external elements such as those found in automatic car wash facilities. The device may include a member movable between first and second positions such that the member in the second position is configured to at least partially cover or encapsulate the wiper assembly. An active material actuator may be used to move the member between the first and second positions. In another embodiment, the device includes a member operatively connected to and configured to stiffen a pivot point of the wiper assembly.

11 Claims, 3 Drawing Sheets

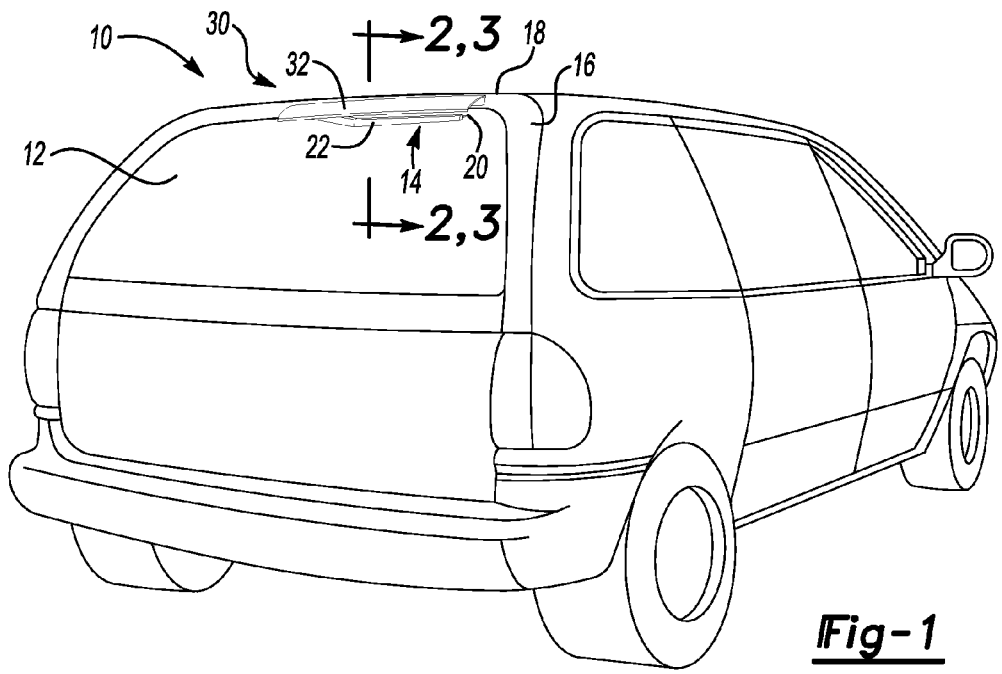
Fig-1
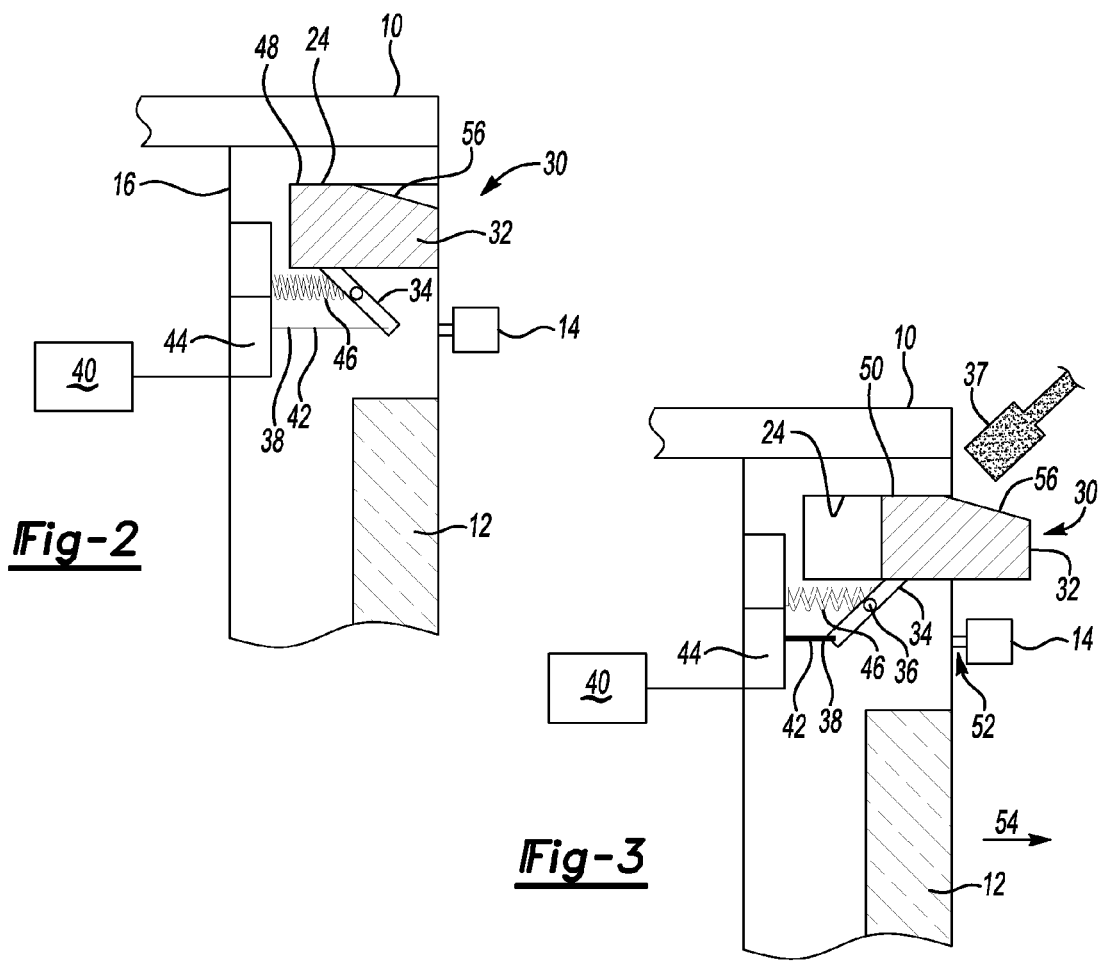
Fig-2
Fig-3

PROTECTIVE DEVICE FOR VEHICLE WIPER ASSEMBLY

TECHNICAL FIELD

The invention relates in general to vehicle wiper assemblies and more specifically, to a protective device for a vehicle wiper assembly.

BACKGROUND

Most motor vehicles are equipped with a wiper assembly which is used to remove rain and debris from a vehicle window. A wiper generally consists of an arm, pivoting at one end, with a blade attached to the other end. The blade is swung back and forth over the window, pushing water from its surface. In a typical automatic car wash, a vehicle is moved on a conveyor while implements such as brushes, rags and pliable extensions are used to clean the exterior of the vehicle, including the vehicle windows. The implements may get entangled with the wiper assembly, resulting in damage to the wiper assembly.

SUMMARY

A protective device for a vehicle wiper assembly is provided. The protective device is configured to selectively and at least partially cover the wiper assembly. The protective device is configured to prevent the wiper assembly from being pulled away from the vehicle and becoming damaged. For example, the protective device may prevent entanglement of the wiper assembly with external elements, such as brushes and rags, found in automatic car wash facilities. The protective device may be used on any wiper assembly in a vehicle, including, but not limited to, the rear window wiper, front windshield wiper and wipers for the headlights.

In one embodiment, the protective device includes a member movable between first and second positions such that the member in the second position is configured to at least partially cover or encapsulate the wiper assembly. An active material actuator may be used to move the member between the first and second positions. In one example, the active material is a shape memory alloy material having a crystallographic phase that is changeable between Martensite and Austenite in response to an activation signal provided by a vehicle operator.

In one embodiment, the member is mounted above a rear window of a vehicle. The member may be at least partially positioned within a cavity formed above the rear window. The member may be configured to at least partially extend out of the cavity in the second position and at least partially retract within the cavity in the first position.

In another embodiment, the member is mounted below a rear window of vehicle. The member may be at least partially positioned within a support element mounted to the vehicle. The member may be configured to at least partially extend out of the support element in the second position and at least partially retract within the support element in the first position.

In another embodiment, the protective device includes one or more members (such as plates, pins or other configurations) that are configured to substantially cover, and thereby stiffen, the pivot points of the wiper assembly. By increasing the rigidity of the overall wiper assembly, the members prevent an external element, such as a brush or rag in an automatic car wash, from entangling, pulling away or dislodging the wiper assembly from the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic rear perspective view of a vehicle illustrating a first embodiment for a protective device having a member, in accordance with the present disclosure;

FIG. 2 is a schematic fragmentary sectional side view of the member of FIG. 1, shown in a first position;

FIG. 3 is a schematic fragmentary sectional side view of the member of FIG. 1, shown in a second position;

DETAILED DESCRIPTION

Figure 4:
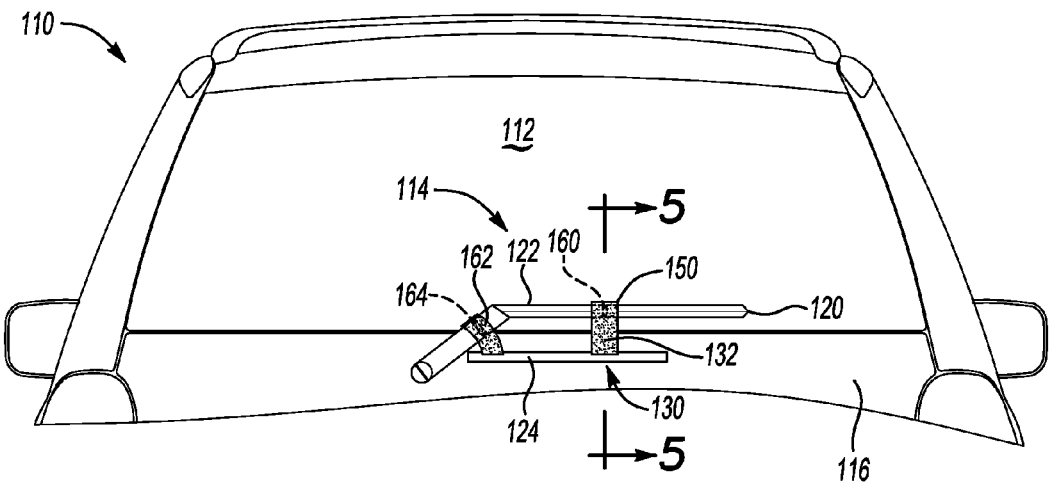
FIG. 4 is a schematic fragmentary rear view of a vehicle illustrating a second embodiment for a protective device having a member, in accordance with the present disclosure.

Referring to the Figures, wherein like reference numbers refer to the same or similar components throughout the several views, FIG. 1 is a schematic rear perspective view of a vehicle 10. Referring to FIG. 1, the vehicle 10 includes a rear window 12 and a wiper assembly 14. The wiper assembly 14 may be configured to selectively wipe the rear window 12. The wiper assembly 14 may be mounted to a top end portion of a rear liftgate or rear panel 16. The wiper assembly 14 may also be mounted to a rear end portion of a roof panel 18. The wiper assembly 14 includes a wiper blade 20 and a wiper arm 22.

Referring to FIGS. 1-3, a protective device 30 is shown. Referring to FIG. 2, the device 30 may be at least partially positioned in an inward cavity 24 provided in the vehicle 10. The cavity 24 may be formed in the rear panel 16 or roof panel 18. The rear wiper motor apparatus (not shown) may also be installed in the cavity 24. The device 30 includes a member 32, shown in FIGS. 1-3. As described below and referring to FIG. 3, the member 32 is configured to selectively prevent an external element 37 from entangling with the wiper assembly 14 and pulling the wiper assembly 14 away from the vehicle 10. For example, the external element 37 may be an implement in an automatic car wash facility.

Referring to FIG. 3, the member 32 may be operatively connected to one end of a lever 34, which rotates about a pivot point 36. Another end of the lever 34 may be operatively connected to an actuator 38. At least a portion of the actuator 38 is an active material that is configured to undergo a change in at least one attribute in response to an activation signal. A controller 40 may be operatively coupled to the actuator 38 and configured to provide an activation signal. The activation signal may include, but is not limited to, a heat signal or an electrical signal, with the particular activation signal dependent on the active material. In the embodiment shown, the active material is a shape memory alloy (SMA) wire 42. For example, the controller 40 may direct an electrical current through the actuator 38 to resistively heat the SMA wire 42. As used herein the term "wire" is non-limiting and shall include other similar geometric configurations presenting tensile load strength/strain capabilities, such as cables, bundles, braids, ropes, strips, chains, ribbons, springs and other elements.

Suitable shape memory alloys can exhibit a one-way shape memory effect, an intrinsic two-way effect, or an extrinsic two-way shape memory effect depending on the alloy composition and processing history. As previously noted, two phases that occur in shape memory alloys are often referred to as Martensite and Austenite phases. The Martensite phase is a relatively soft and easily deformable phase of the shape memory alloys, which generally exists at lower temperatures. The Austenite phase, the stiffer phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic two-way shape memory effect are fabricated from a shape memory alloy composition that will automatically reform themselves upon removal of the cause for deviation.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. In one specific example, the shape memory alloy may include nickel and titanium.

A shape memory alloy is characterized by a cold state, i.e., when the temperature of the alloy is below its Martensite finish temperature $M_f$. A shape memory alloy is also characterized by a hot or superelastic state, i.e., when the temperature of the alloy is above its Austenite finish temperature $A_f$. An object formed of the alloy may be characterized by a threshold shape. When the object is pseudo-plastically deformed from its threshold shape in the cold state, the strain may be reversed by heating the object above its austenite finish temperature $A_f$, i.e., applying a thermal activation signal sufficient to heat the object above its $A_f$ will cause the object to return to its threshold shape. An SMA's modulus of elasticity and yield strength are also significantly lower in the cold state than in the hot state. As understood by those skilled in the art, pseudo-plastic strain is similar to plastic strain in that the strain persists when the shape memory alloy is in the cold state.

In the embodiment shown, the SMA wire 42 has two ends. Referring to FIGS. 2-3, one end of the SMA wire 42 may be operatively connected to a fixed structure 44 in the vehicle 10. Another end of the SMA wire 42 may be operatively connected to the member 32 (through the lever 34). The SMA wire 42 has a predetermined length. When the SMA wire 42 is in a cold state, its elastic modulus and apparent yield strength are sufficiently low such that the SMA wire 42 is elongated from its predetermined length. The controller 40 may be prompted by a vehicle operator to direct an electrical current to the SMA wire 42 to a point where a crystallographic phase transformation occurs from Martensite to Austenite. In other words, the SMA wire 42 transitions from a cold state to a hot state. For example, when entering a car wash, the vehicle operator may press a switch on a vehicle dashboard (not shown) that selectively prompts the controller 40.

Referring to FIGS. 2-3, the member 32 is operatively connected to the SMA wire 42 such that the change in attribute in response to the activation signal causes the member 32 to selectively move between a first position 48 (shown in FIG. 2) and a second position 50 (shown in FIG. 3). When activated to its hot state, the SMA wire 42 contracts or reverts to its predetermined length and increases in modulus, thereby drawing or pulling the lever 34. This causes the member 32 to at least partially extend out of the cavity 24 and into the second position 50. Upon the removal of the activation signal, the SMA wire 42 cools, and transitions to its cold state shown in FIG. 2. Once in the cold state, its elastic modulus and yield strength are sufficiently low that the SMA wire 42 is elongated from its predetermined length. Optionally, a biasing member such as extension spring 46 (shown in FIGS. 2-3) may be operatively connected to the lever 34 and configured to urge or bias the member 32 to retract towards its first position 48.

Referring to FIG. 3, the member 32 in the second position 50 is configured to extend at least partially over the wiper assembly 14, thereby preventing the external element 37 from entering a gap 52 between the wiper assembly 14 and the rear window 12. In one example, the member 32 prevents the wiper assembly 14 from being pulled away from the vehicle 10 in a direction 54 (shown in FIG. 3) that is approximately perpendicular to the rear window 12. Referring to FIG. 1, optionally, the member 32 may extend laterally along the entire length of the wiper blade 20. Referring to FIGS. 1-3, optionally, the member 32 may be provided with an inclined portion 56. The inclined portion 56 may prevent accumulation of fluids and/or allow the external element 37, such as a brush in a car wash facility, to slide smoothly over the inclined top portion 56. In one example, the angle of the inclined portion 56 is approximately 30 degrees.

The member 32 may be composed of a material that is sufficiently rigid to resist being deformed or crushed by the external element 37 (see FIG. 3). For example, the member 32 may be composed of a metal, plastic, fiberglass composite or any other suitable material. The length and width of the member 32 may be selected by one of ordinary skill in the art for the particular application.

Figure 6:
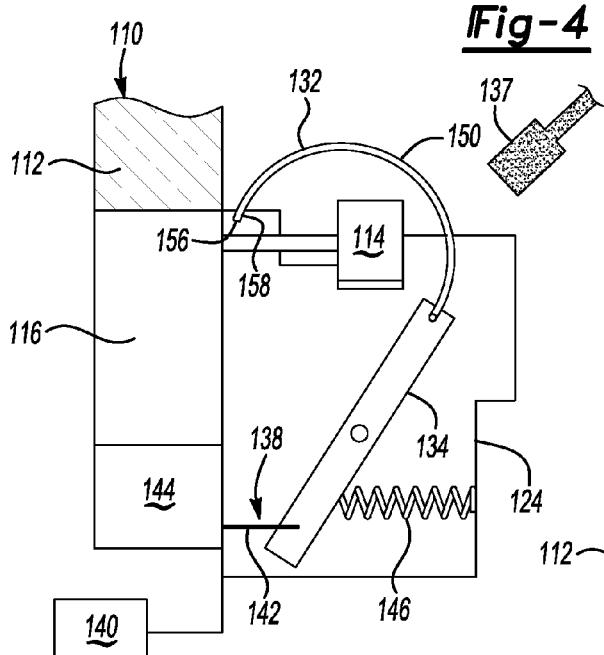
FIG. 6 is a schematic fragmentary sectional side view of the member of FIG. 4, shown in a second position.
Figure 5:
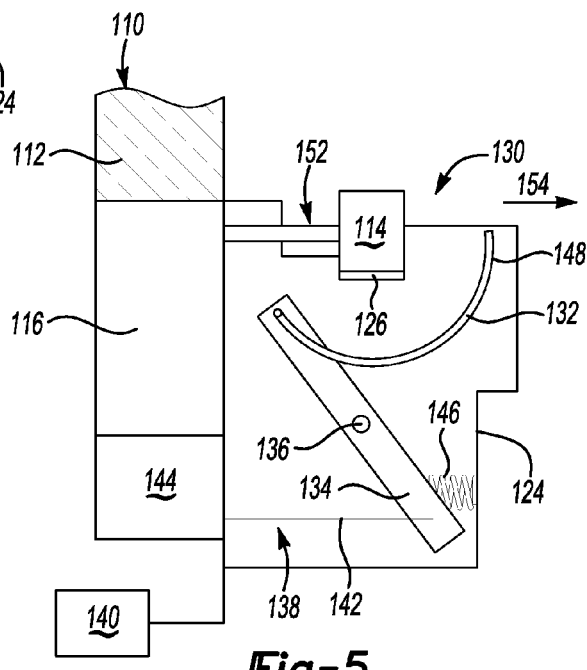
FIG. 5 is a schematic fragmentary sectional side view of the member of FIG. 4, shown in a first position.

Referring to FIGS. 4-6, a protective device 130 illustrating a second embodiment is shown in a vehicle 110. FIG. 4 is a schematic fragmentary rear view of the vehicle 110. Referring to FIG. 4, the vehicle 110 includes a rear window 112 and a wiper assembly 114. The wiper assembly 114 may be configured to selectively wipe the rear window 112. The wiper assembly 114 may be mounted to a portion of a rear panel 116 that is below the rear window 112. The wiper assembly 114 includes a wiper blade 120 and wiper arm 122. A support element 124 is mounted below the wiper assembly 114. The support element 124 may extend at least partially along the length of the wiper assembly 114. When not in operation, the wiper assembly 114 may be configured to rest above the support element 124. For example, the support element 124 may be built with a seat 126 (see FIG. 5) for supporting the wiper assembly 114.

Referring to FIGS. 4-6, the device 130 includes a member 132 at least partially positioned in the support element 124. Referring to FIGS. 5-6, the member 132 is configured to selectively prevent an external element 137 from entangling with the wiper assembly 114 and pulling the wiper assembly 114 away from the vehicle 110. For example, the external element 137 may be an implement in an automatic car wash facility.

Referring to FIGS. 5-6, the member 132 may be operatively connected to one end of a lever 134, which rotates about a pivot point 136. Another end of the lever 134 may be operatively connected to an actuator 138. At least a portion of the actuator 138 is an active material that is configured to undergo a change in at least one attribute in response to an activation signal. A controller 140 may be operatively coupled to the actuator 138 and configured to provide an activation signal. The activation signal may include, but is not limited to, a heat signal or an electrical signal, with the particular activation signal dependent on the active material. In the embodiment shown, the active material is a shape memory alloy (SMA) wire 142. For example, the controller 140 may direct an electrical current through the actuator 138 to resistively heat the SMA wire 142. As used herein the term "wire" is non-limiting and shall include other similar geometric configurations presenting tensile load strength/strain capabilities, such as cables, bundles, braids, ropes, strips, chains, ribbons, springs and other elements.

In the embodiment shown, the SMA wire 142 has two ends. Referring to FIGS. 5-6, one end of the SMA wire 142 may be operatively connected to a fixed structure 144 in the vehicle. Another end of the SMA wire may be operatively connected to the member 132 (through the lever 134). The SMA wire 142 has a predetermined length. When the SMA wire 142 is in a cold state, its elastic modulus and yield strength are sufficiently low such that the SMA wire 142 is elongated from its predetermined length. In one example, the controller 140 is prompted by a vehicle operator to direct an electrical current to the SMA wire 142 to a point where a crystallographic phase transformation occurs from Martensite to Austenite. In other words, the SMA wire 142 transitions from a cold state to a hot state. For example, when entering a car wash, the vehicle operator may press a switch (not shown) on the vehicle dashboard that selectively prompts the controller 140.

Referring to FIGS. 4-6, the member 132 is operatively connected to the SMA wire 142 such that the change in attribute in response to an activation signal causes the member 132 to selectively move between a first position 148 (shown in FIG. 5) and a second position 150 (shown in FIG. 6). When activated to its hot state, the SMA wire 142 contracts or reverts to its predetermined length and increases in modulus, thereby drawing or pulling the lever 134. This causes the member 132 to at least partially extend out of the support element 124 and into the second position 150. Upon the removal of the activation signal, the SMA wire 142 cools, and transitions to its cold state shown in FIG. 5. Once in the cold state, its elastic modulus and yield strength are sufficiently low that the SMA wire 142 is elongated from its predetermined length. Optionally, a biasing member such as extension spring 146 (shown in FIGS. 5-6) may be operatively connected to the lever 134 and configured to urge or bias the member 132 to retract towards its first position 148.

Referring to FIGS. 5-6, the member 132 in the second position 150 is configured to extend at least partially over the wiper assembly 114, thereby preventing the external element 137 (see FIG. 6) from entering a gap 152 (see FIG. 5) between the wiper assembly 114 and rear window 112. In one example, the member 132 prevents the wiper assembly 114 from being pulled away from the vehicle 110 in the direction 154 (see FIG. 5) that is approximately perpendicular to the rear window 112. Additional mechanical elements for constraining the deploying motion of member 132 and lever 134 are not shown and may be added; for example, a track with a slider, or a set of gears may be added between member 132, lever 134 and the support element 124. Referring to FIG. 6, optionally, an end 156 of the member 132 may be configured to snap or fit into a cavity 158. The cavity 158 may be formed in the rear panel 116 or support element 124. The member 132 may be hook-shaped (as shown in FIGS. 5-6) and configured to retain the wiper assembly 114 relative to the vehicle 110, i.e., keeping the wiper assembly 114 from being pulled away. Additional mechanical elements may be added to reversibly connect the wiper assembly 114 to the end 156 of the member 132 for retaining the wiper assembly 114 relative to the vehicle 110.

The member 132 may be composed of a material that is sufficiently rigid to resist being deformed or crushed by the external element 137. For example, the member 132 may be composed of a metal, plastic, polymer or any other suitable material. The length and width of the member 132 may be selected by one of ordinary skill in the art for the particular application. Optionally, the member 132 may be used as a removable piece that is manually attached onto the wiper assembly 114.

Referring to FIG. 4, in this embodiment, the wiper assembly 114 includes first and second pivot points 160, 164. In one example, the member 132 is selectively movable to substantially encapsulate the first pivot point 160. Referring to FIG. 4, a second member 162, similar to the member 132, may be used to substantially encapsulate the second pivot point 164. Optionally, more than two members may be used to latch the wiper assembly 114 at respective multiple locations.

Figure 7:
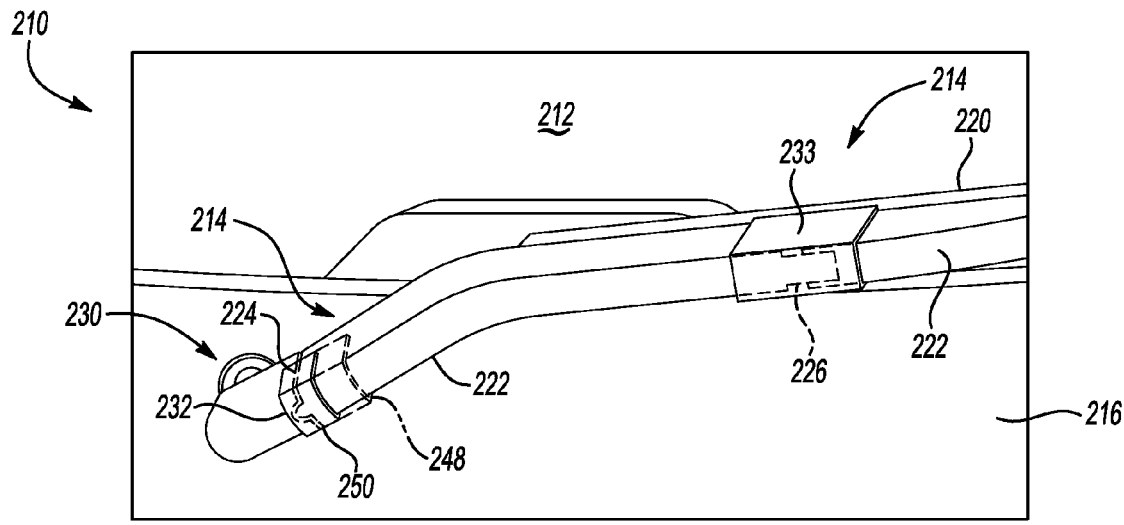
FIG. 7 is a schematic fragmentary rear view of a vehicle illustrating a third embodiment for a protective device, in accordance with the present disclosure.
Figure 8:
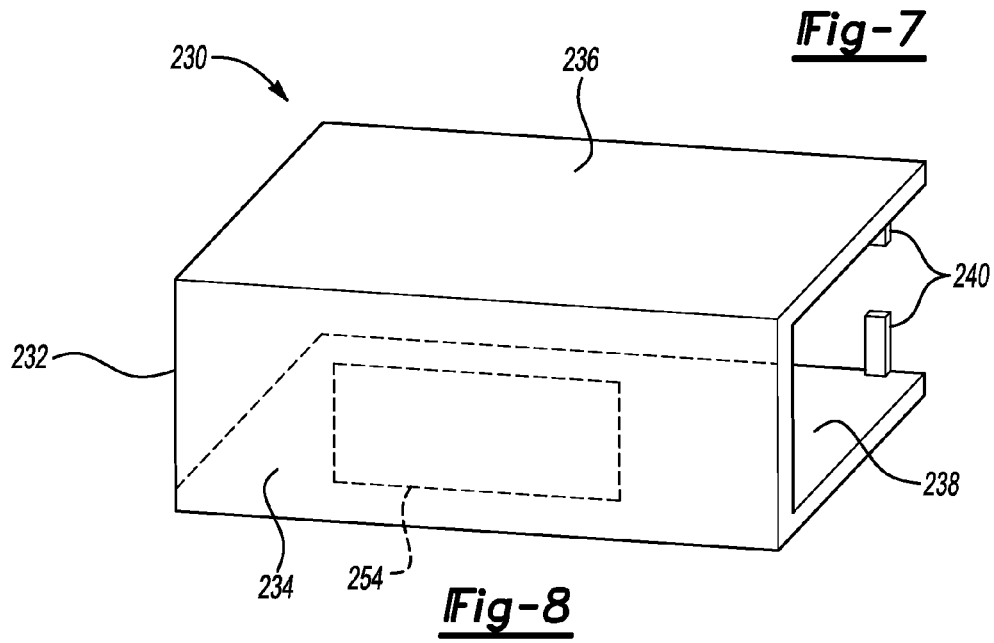
FIG. 8 is a schematic perspective view of a first member that may be used in the device of FIG. 7.

Referring to FIGS. 7-8, a protective device 230 illustrating a third embodiment is shown in a vehicle 210. FIG. 7 is a schematic fragmentary rear view of the vehicle 210. Referring to FIG. 7, the vehicle 210 includes a rear window 212 and a wiper assembly 214. The wiper assembly 214 may be configured to selectively wipe the rear window 212. The wiper assembly 214 may be mounted to a portion of a rear panel 216 that is below the rear window 212. The wiper assembly 214 includes a wiper blade 220 and wiper arm 222. In the embodiment shown in FIG. 7, the wiper assembly 214 includes first and second pivot points 224, 226. Alternatively, a wiper assembly 214 may include only one joint/pivot point or more than two joints/pivot points.

Referring to FIG. 7, the protective device 230 includes a first member 232 operatively connected to the wiper assembly 214 and configured to substantially cover, and thereby stiffen, the first pivot point 224. By increasing the rigidity of the overall wiper assembly 214, the first member 232 prevents an external element, such as a brush or rag in an automatic car wash, from pulling away or dislodging the wiper assembly 214 from the vehicle 210. The first member 232 is movable between a first position 248 (shown in phantom) and a second position 250. When in the second position 250, the first member 232 is configured to substantially cover, and thereby stiffen, the first pivot point 224. By increasing the rigidity of the overall wiper assembly 214, the first member 232 prevents an external element, such as a brush or rag in an automatic car wash, from pulling away or dislodging the wiper assembly 214 from the vehicle 210.

Referring to FIG. 8, the first member 232 may include a substantially flat base portion 234, with flanges 236, 238 extending from opposing sides of the base portion 234. Optionally, the first member 232 may be formed with one or more locating tabs 240 that are fittable into corresponding slots (not shown) in the wiper assembly 214, in order to secure its position relative to the wiper assembly 214. Optionally, the first member 232 may include a self-adhesive backing 254, such as flexible glue, putty or other reusable adhesives for reversible attachment to the wiper assembly 214.

Referring to FIG. 7, the protective device 230 may include a second member 233 operatively connected to the wiper assembly 214 and configured to substantially cover, and thereby lock or stiffen, the second pivot point 226. The second member 233 may be similar to or different from the first member 232. The first and second members 232, 233 may be fashioned as plates, pins or other suitable configurations. The first and second members 232, 233 may be composed of a material that is sufficiently rigid to resist being deformed or crushed. For example, the first and second members 232, 233 may be composed of metal, fiberglass composite or other suitable material. The first and second members 232, 233 are configured to be retracted or released when the rear wiper switch (not shown) is activated. The respective lengths and widths of the first and second members 232, 233 may be selected by one of ordinary skill in the art for the particular application.

Figure 9:
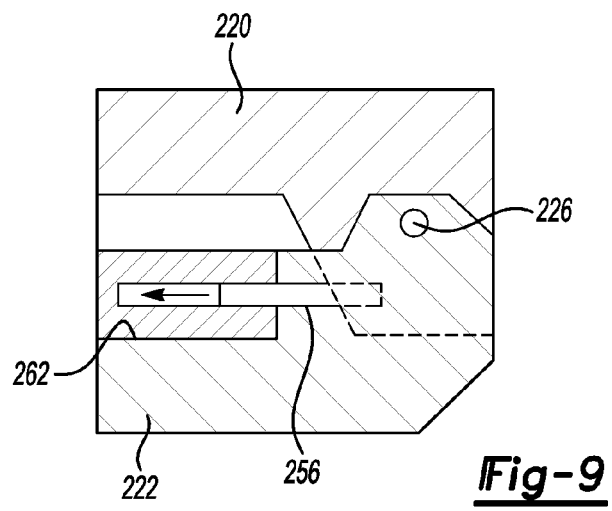
FIG. 9 is a schematic fragmentary sectional view of a third member that may be used in the device of FIG. 7.

Alternatively, referring to FIG. 9, a third element 256 may be operatively connected to an interior portion of the wiper assembly 214 at one or both of the first and second pivot points 224, 226 and configured to stiffen or lock the respective pivot points 224, 226. As noted, the first, second and third members 232, 233, 256 may be fashioned as plates, pins or other suitable configurations. The third element 256 may be employed to operatively connect one portion of the wiper assembly 214 to another portion of the wiper assembly 214. In one example, referring to FIG. 9, the third element 256 rests in a sleeve or pocket 262 on the wiper arm 222. The third element 256 is moved (as shown in FIG. 9) to engage in a mating pocket on the wiper blade 220, thereby linking the wiper arm 222 to the blade 220. The third element 256 may be actuated by SMA materials as previously described. Additional mechanical parts known to those of ordinary skill in the art may be added. The first, second and third elements 232, 233, 256 may be used independently of one another.

The protective devices 30, 130, 230, 232, 233, 256 may be used on any wiper assembly in a vehicle including, but not limited to, the rear window, front windshield, side windows and headlights. The controllers 40, 140 may be embodied as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. The controllers 40, 140 may include such electronic components as necessary to generate an electrical signal capable of resistively heating a shape memory alloy material.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a wiper assembly including a wiper blade configured to wipe a window of a vehicle and a wiper arm operatively connected to the wiper blade;
a protective device configured to selectively and at least partially cover the wiper assembly, the device including a member movable between first and second positions such that the member in the second position is configured to at least partially cover the wiper assembly;
an active material actuator configured to move the member between the first and second positions;
wherein the active material actuator includes a shape memory alloy material having a crystallographic phase that is changeable between Austenite and Martensite in response to an activation signal, the phase change causing a contraction of the shape memory alloy material;
a rotatable lever operatively connected to the shape memory alloy material; and
a spring operatively connected to the lever at one end and fixed at another end, the spring being configured to bias the member towards the first position.

2. The apparatus of claim 1, wherein the device is configured to prevent the wiper assembly from being pulled away from the vehicle in a direction approximately perpendicular to the window.

3. The apparatus of claim 1, wherein the window is positioned at the rear of the vehicle.

4. The apparatus of claim 1, further comprising:
a support element configured to be mounted to the vehicle, the wiper assembly being configured to selectively rest above the support element;
wherein the member is at least partially retracted inside the support element in the first position and at least partially extended out of the support element in the second position.

5. A vehicle comprising:
a window;
a wiper assembly including a wiper blade configured to selectively wipe the window and a wiper arm operatively connected to the wiper blade;
a member movable between first and second positions such that the member in the second position is configured to cover at least a portion of the wiper assembly;
an active material actuator configured to move the member between the first and second positions;
wherein the active material actuator includes a shape memory alloy material having a crystallographic phase that is changeable between Austenite and Martensite in response to an activation signal, the phase change causing a contraction of the shape memory alloy material;
a rotatable lever operatively connected to the shape memory alloy material; and
a spring operatively connected to the lever at one end and fixed at another end, the spring being configured to bias the member towards the first position.

6. The vehicle of claim 5, further comprising:
a support element configured to be mounted to the vehicle, the wiper assembly being configured to selectively rest above the support element;
wherein the member is at least partially retracted within the support element in the first position and at least partially extended out of the support element in the second position.

7. The vehicle of claim 5, further comprising:
a first pivot point defined by the wiper assembly; and
wherein the member in the second position is configured to substantially encapsulate the first pivot point of the wiper assembly.

8. The vehicle of claim 7, further comprising:
a second pivot point defined by the wiper assembly; and
a second member movable between first and second positions, the second member in the second position being configured to substantially encapsulate the second pivot point of the wiper assembly.

9. A vehicle comprising:

a rear window;

a wiper assembly including a wiper blade configured to selectively wipe the window and a wiper arm operatively connected to the wiper blade;

a first pivot point defined by the wiper assembly;

a member movable between first and second positions, the member in the second position being configured to substantially cover the first pivot point of the wiper assembly;

an active material actuator configured to move the member between the first and second positions; and wherein the active material actuator includes a shape memory alloy (SMA) wire having a crystallographic phase that is changeable between Austenite and Martensite in response to an activation signal, the phase change causing a contraction of the SMA wire;

a second pivot point defined by the wiper assembly; and a second member movable between first and second positions, the second member in the second position being configured to substantially cover the second pivot point of the wiper assembly.

10. The vehicle of claim 5, further comprising:

a cavity formed in the vehicle and positioned above the window;

wherein the member is at least partially retracted within the cavity in the first position and at least partially extended out of the cavity in the second position.

11. The vehicle of claim 5, wherein the member extends along an entire length of the wiper blade.

* * * * *